(12) United States Patent
Tatsumisago et al.

(10) Patent No.: US 9,064,615 B2
(45) Date of Patent: Jun. 23, 2015

(54) SULFIDE SOLID ELECTROLYTE MATERIAL

(75) Inventors: Masahiro Tatsumisago, Sakai (JP); Akitoshi Hayashi, Sakai (JP); Shigenori Hama, Susono (JP); Koji Kawamoto, Miyoshi (JP); Yasushi Tsuchida, Susono (JP); Hiroshi Nagase, Susono (JP); Yukiyoshi Ueno, Gotenba (JP); Masato Kamiya, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 705 days.

(21) Appl. No.: 13/203,379

(22) PCT Filed: Feb. 2, 2010

(86) PCT No.: PCT/JP2010/051407
§ 371 (c)(1),
(2), (4) Date: Oct. 19, 2011

(87) PCT Pub. No.: WO2010/098177
PCT Pub. Date: Sep. 2, 2010

(65) Prior Publication Data
US 2012/0034529 A1 Feb. 9, 2012

(30) Foreign Application Priority Data

Feb. 27, 2009 (JP) ................................. 2009-045784

(51) Int. Cl.
*H01M 4/02* (2006.01)
*H01M 4/36* (2006.01)
(Continued)

(52) U.S. Cl.
CPC .......... *H01B 1/06* (2013.01); *H01M 2300/0068* (2013.01); *H01M 2300/0065* (2013.01);
(Continued)

(58) Field of Classification Search
CPC ............... H01M 2300/002; H01M 2300/0065; H01M 2300/0068; H01M 10/0562; H01M 10/052; H01M 4/621
USPC .......... 429/303, 321, 322, 304, 319; 29/623.1
See application file for complete search history.

(56) References Cited

U.S. PATENT DOCUMENTS

2005/0107239 A1* 5/2005 Akiba et al. .................... 501/40
2007/0160911 A1 7/2007 Senga et al.
(Continued)

FOREIGN PATENT DOCUMENTS

EP 2 383 829 A1 11/2011
JP A-6-275322 9/1994
(Continued)

OTHER PUBLICATIONS

Homma et al., "Structure of lithium solid electrolyte Thio-LISICON, Li3PS4—correction of structure and ion-conduction", 10th Abstract, 214th ECS Meeting, Honolulu, HI, Oct. 12-17, 2008.*
(Continued)

*Primary Examiner* — Kenneth Douyette
(74) *Attorney, Agent, or Firm* — Oliff PLC

(57) ABSTRACT

The main object of the present invention is to provide a sulfide solid electrolyte material with less hydrogen sulfide generation amount. The present invention solves the above-mentioned problem by providing a sulfide solid electrolyte material obtained by using a raw material composition containing $Li_2S$ and sulfide of an element of the fourteenth family or the fifteenth family, characterized by not substantially containing cross-linking sulfur and $Li_2S$.

7 Claims, 4 Drawing Sheets

(51) Int. Cl.
 *H01B 1/06* (2006.01)
 *H01M 4/62* (2006.01)
 *H01M 10/052* (2010.01)
 *H01M 10/0562* (2010.01)

(52) U.S. Cl.
 CPC ............ *H01M4/621* (2013.01); *H01M 10/052* (2013.01); *H01M 10/0562* (2013.01); *H01M 2300/002* (2013.01); *Y02E 60/122* (2013.01); *Y02T 10/7011* (2013.01)

(56) References Cited

U.S. PATENT DOCUMENTS

| | | | |
|---|---|---|---|
| 2009/0159839 A1 | 6/2009 | Seino et al. | |
| 2010/0047691 A1 | 2/2010 | Kawakami | |
| 2010/0273062 A1* | 10/2010 | Tsuchida et al. | ............. 429/304 |

FOREIGN PATENT DOCUMENTS

| | | | | |
|---|---|---|---|---|
| JP | A-6-279050 | | 10/1994 | |
| JP | A-2002-109955 | | 4/2002 | |
| JP | B2-3510420 | | 3/2004 | |
| JP | A-2005-228570 | | 8/2005 | |
| JP | A-2008-4334 | | 1/2008 | |
| JP | 2008103096 A | * | 5/2008 | ............... H01B 1/06 |
| JP | A-2008-103287 | | 5/2008 | |
| JP | A-2009-110920 | | 5/2009 | |
| KR | 10-2008-0069236 | | 7/2008 | |
| WO | 2008/050903 A1 | | 5/2008 | |
| WO | WO 2010/038313 A1 | | 4/2010 | |

OTHER PUBLICATIONS

Machine Translation of: JP 2008/103096 A, Chiga et al., May 1, 2008.*

Machida et al., "Preparation of amorphous $75L_2S \cdot xP_2S_3 \cdot (25-x)P_2S_5$ (mol%) solid electrolytes by a high-energy ball-milling process and their application for an all-solid-state lithium battery," *Solid State Ionics*, 2005, pp. 473-479, vol. 176, Elsevier B.V.

Hayashi et al., "Preparation of $Li_2S-P_2S_5$ Amorphous Solid Electrolytes by Mechanical Milling," *Journal of American Ceramic Society*, 2001, pp. 477-479, vol. 84, No. 2, American Ceramic Society, USA.

Nakagawa et al.; "$Li_2S-P_2S_5$-kei Glass Oyobi Glass Ceramics no Kotai $^{31}$PNMR-ho ni yoru Kozo Kaiseki;" *Kotai NMR-Zairyo Forum Hokoku*; 2008; pp. 27-30; No. 44/9 (with translation).

Tatsumisago et al.; "Lithium Ion Dendosei Kesshoka Glass;" *Ceramics*; 2008; pp. 1051-1054; vol. 43, No. 12; The Ceramic Society of Japan (with translation).

International Search Report dated May 11, 2010 in International Application No. PCT/JP2010/051407 (with translation).

Tatsumisago et al., "Preparation of lithium ion conducting glasses and glass-ceramics for all-solid-state batteries." Journal of Non-Crystalline Solids, 2007, pp. 1411-1417, vol. 354.

Sakuda et al., "Improvement of High-Rate Performance of All-Solid-State Lithium Secondary Batteries Using $LiCoO_2$ Coated with $Li_2O?-?SiO_2$ Glasses." Electrochemical and Solid-State Letters, 2008, pp. A1-A3, vol. 1(1).

Kitaura et al., "Preparation of $\alpha$-$Fe_2O_3$ Electrode Materials via Solution Process and Their Electrochemical Properties in All-Solid-State Lithium Batteries." Journal of the Electrochemical Society, 2007, pp. A725-A729, vol. 154 (7).

Liu et al. "Preparation of new lithium ion composite electrolyte $3Li_4SiS_4-0.5La_2S_3$ by mechanical milling", Solid State Sciences, 10 (2008), pp. 1429-1433.

Murayama et al. "Structure of the thio-LISICON, $Li_4GeS_4$", Solid State Ionics, 154-155 (2002), pp. 789-794.

Makita et al. "Electrochemical Property of Solid Solutions $Li_4Ge(S1-xSex)4$", Preliminary Reports of Conference held by the Chemical Society of Japan, 84th (2004), pp. 414.

Kanno et al. "Lithium Ionic Conductor Thio-LISICON", Journal of Electrochemical Society, 148(7) (2001), A742-A746.

Tatsumisago et al. "Glassy materials based on $Li_2S$ for all-solid-state lithium secondary batteries", Solid State Ionics. 2004, vol. 175, pp. 13-18.

Eckert et al. "Glass formation in non-oxide chalcogenide systems. Structural elucidation of Li2S-SiS2-LiI solid electrolytes by quantitative 29Si, 6Li and 7Li high resolution solid state NMR methods", Journal of Non-Crystalline Solids, 1989, vol. 107, pp. 271-282.

* cited by examiner

SULFIDE SOLID ELECTROLYTE MATERIAL

TECHNICAL FIELD

The present invention relates to a sulfide solid electrolyte material with less hydrogen sulfide generation amount.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in technical structure and material for preventing the short circuit are necessary therefor.

On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, a sulfide solid electrolyte material has been known as a solid electrolyte material used for such a solid electrolyte layer.

The sulfide solid electrolyte material is so high in Li ion conductivity as to be useful for intending higher output of a battery, and various kinds of research have been conventionally made. For example, in Patent Literature 1, a glassy sulfide solid electrolyte material, such that the main component is composed of $Li_2S$—X (X is $SiS_2$, $GeS_2$, $P_2S_5$ and $B_2S_3$), and a producing method for a sulfide solid electrolyte material by melt extraction are disclosed. In addition, in Examples of Patent Literature 1, a $0.6Li_2S$-$0.4SiS_2$-based sulfide solid electrolyte material and $0.6Li_2S$-$0.4GeS_2$-based sulfide solid electrolyte material produced by melt extraction are disclosed. Also, in Patent Literature 2, an $Li_2S$—$SiS_2$-based glassy sulfide solid electrolyte material such that $Li_2S$ synthesized on the specific conditions is used as a raw material is disclosed. In addition, in Examples of Patent Literature 2, a $60Li_2S$-$40SiS_2$-based sulfide solid electrolyte material and a $63Li_2S$-$36SiS_2$-$1Li_3PO_4$-based sulfide solid electrolyte material produced by melt extraction are disclosed.

On the other hand, in Patent Literature 3, a sulfide-based crystallized glass such that a glassy phase having $Li_2S$ and $P_2S_5$ as the main component and a crystal phase exist is disclosed. Also, in Patent Literature 4, an $Li_2S$—$P_2S_5$-based crystallized glass having a specific diffraction peak by X-ray diffraction is disclosed.

CITATION LIST

Patent Literature

Patent Literature 1: Japanese Patent Application Publication No. H06-279050
Patent Literature 2: Japanese Patent No. 3510420
Patent Literature 3: Japanese Patent Application Publication No. 2002-109955
Patent Literature 4: Japanese Patent Application Publication No. 2005-228570

SUMMARY OF INVENTION

Technical Problem

The problem is that a conventional sulfide solid electrolyte material generates much hydrogen sulfide in the case of contacting with water (including moisture, and so forth). The present invention has been made in view of the above-mentioned problems, and the main object thereof is to provide a sulfide solid electrolyte material with less hydrogen sulfide generation amount.

Solution to Problem

To solve the above-mentioned problem, the present invention provides a sulfide solid electrolyte material using a raw material composition containing $Li_2S$ and sulfide of an element of the group 14 or the group 15 in the periodic table; containing substantially no cross-linking sulfur and $Li_2S$.

The present invention allows a sulfide solid electrolyte material with less hydrogen sulfide generation amount for the reason that the sulfide solid electrolyte material contain substantially no cross-linking sulfur and $Li_2S$.

In the above-mentioned invention, the above-mentioned sulfide solid electrolyte material is preferably sulfide glass. The reason therefor is that it is conceived that sulfide glass may absorb expansion and contraction of an active material to be excellent in cycle characteristics in the case of producing, for example, a solid state battery by reason of being soft as compared with crystallized sulfide glass.

In the above-mentioned invention, preferably, a peak of the cross-linking sulfur is not detected by Raman spectroscopy measurement, and a peak of the $Li_2S$ is not detected by X-ray diffraction measurement.

In the above-mentioned invention, the element of the group 14 or the group 15 is preferably P, Si or Ge. The reason therefor is to obtain a sulfide solid electrolyte material with lower hydrogen sulfide generation amount.

In the above-mentioned invention, preferably, the raw material composition contains only $Li_2S$ and $P_2S_5$, and a molar fraction of the $Li_2S$ contained in the raw material composition is within a range of 70% to 85%. The reason therefor is that hydrogen sulfide generation amount may be lowered more by determining the range of a molar fraction of the $Li_2S$ at the range including a value (75%) for obtaining an ortho-composition and the vicinity thereof.

In the above-mentioned invention, preferably, the raw material composition contains only $Li_2S$ and $SiS_2$ or only $Li_2S$ and $GeS_2$, and a molar fraction of the $Li_2S$ contained in the raw material composition is within a range of 50% to 80%. The reason therefor is that hydrogen sulfide generation amount may be lowered more by determining the range of a molar fraction of the $Li_2S$ at a value (66.7%) for obtaining an ortho-composition and the vicinity thereof.

Furthermore, the present invention provides a sulfide solid electrolyte material obtained by amorphizing a raw material composition containing only $Li_2S$ and $P_2S_5$; characterized in that a molar fraction of the $Li_2S$ in the raw material composition is within a range of 70% to 85%.

The present invention allows a sulfide solid electrolyte material with less hydrogen sulfide generation amount for the reason that a molar fraction of $Li_2S$ in a raw material composition is in a predetermined range.

Furthermore, the present invention provides a lithium battery comprising a cathode active material layer containing a cathode active material, an anode active material layer containing an anode active material, and an electrolyte layer formed between the cathode active material layer and the anode active material layer; characterized in that at least one of the cathode active material layer, the anode active material layer and the electrolyte layer contains the sulfide solid electrolyte material.

According to the present invention, the use of the above-mentioned sulfide solid electrolyte material allows a lithium battery with less hydrogen sulfide generation amount.

Furthermore, the present invention provides a producing method for a sulfide solid electrolyte material comprising steps of: preparing a raw material composition containing $Li_2S$ and sulfide including an element of the group 14 or the group 15 in the periodic table; and amorphizing the raw material composition by amorphization treatment; characterized in that the raw material composition contains the $Li_2S$ and the sulfide including the element of the group 14 or the group 15 at a ratio for obtaining a sulfide solid electrolyte material containing substantially no cross-linking sulfur and $Li_2S$.

The present invention allows a sulfide solid electrolyte material with less hydrogen sulfide generation amount for the reason that a raw material composition contains $Li_2S$ and sulfide including an element of the group 14 or the group 15 at a predetermined ratio.

In the above-mentioned invention, preferably, the raw material composition contains only $Li_2S$ and $P_2S_5$, and a molar fraction of the $Li_2S$ contained in the raw material composition is within a range of 70% to 85%. The reason therefor is that hydrogen sulfide generation amount may be lowered more by determining the range of a molar fraction of the $Li_2S$ at the range including a value (75%) for obtaining an ortho-composition and the vicinity thereof.

In the above-mentioned invention, the amorphization treatment is preferably mechanical milling. The reason therefor is that treatment at normal temperature may be performed to intend the simplification of production processes.

Advantageous Effects of Invention

The present invention produces the effect such as to allow the generation of hydrogen sulfide to be restrained even in the case where a sulfide solid electrolyte material contacts with water.

DESCRIPTION OF EMBODIMENTS

Figure 1:
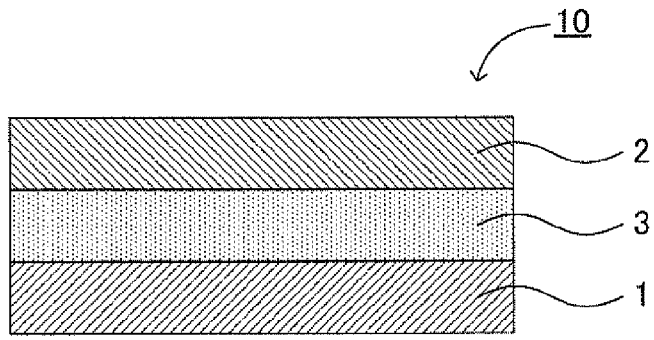
FIG. 1 is a schematic cross-sectional view showing an example of a power generating element of a lithium battery of the present invention.

A sulfide solid electrolyte material, a lithium battery and a producing method for a sulfide solid electrolyte material of the present invention are hereinafter described in detail.

A. Sulfide Solid Electrolyte Material

A sulfide solid electrolyte material of the present invention is first described. A sulfide solid electrolyte material of the present invention may be roughly divided into two embodiments. A sulfide solid electrolyte material of the present invention is hereinafter described while divided into a first embodiment and a second embodiment.

1. First Embodiment

A first embodiment of a sulfide solid electrolyte material of the present invention is first described. The sulfide solid electrolyte material of the first embodiment uses a raw material composition containing $Li_2S$ and sulfide of an element of the group 14 or the group 15 of the periodic table, and contains substantially no cross-linking sulfur and $Li_2S$.

The embodiment allows a sulfide solid electrolyte material with less hydrogen sulfide generation amount for the reason that the sulfide solid electrolyte material contain substantially no cross-linking sulfur and $Li_2S$. Such a sulfide solid electrolyte material is conceived to be high in stability toward water and low in hydrogen sulfide generation amount by reason of having an ortho-composition or a composition in the neighborhood thereof. Here, ortho generally signifies oxo acid which is the highest in degree of hydration among oxo acids obtained by hydrating the same oxide. In the present invention, a crystal composition to which $Li_2S$ is added most among sulfides is called an ortho-composition. For example, $Li_3PS_4$ corresponds to an ortho-composition in the $Li_2S$—$P_2S_5$ system, $Li_4SiS_4$ corresponds to an ortho-composition in the $Li_2S$—$SiS_2$ system, and $Li_4GeS_4$ corresponds to an ortho-composition in the $Li_2S$—$GeS_2$ system. For example, in the case of an $Li_2S$—$P_2S_5$-based sulfide solid electrolyte material, the molar fraction of $Li_2S$ for obtaining an ortho-composition is 75%. On the other hand, in the case of an $Li_2S$—$SiS_2$-based or $Li_2S$—$GeS_2$-based sulfide solid electrolyte material, the molar fraction of $Li_2S$ for obtaining an ortho-composition is 66.7%.

As described above, in Patent Literature 1, a $0.6Li_2S$-$0.4SiS_2$-based sulfide solid electrolyte material and a $0.6Li_2S$-$0.4GeS_2$-based sulfide solid electrolyte material produced by melt extraction are disclosed. Also, in Patent Literature 2, a $60Li_2S$-$40SiS_2$-based sulfide solid electrolyte material and a $63Li_2S$-$36SiS_2$-$1Li_3PO_4$-based sulfide solid electrolyte material produced by melt extraction are disclosed. However, the problem is that these sulfide solid electrolyte materials react easily with water to easily generate hydrogen sulfide by reason of containing cross-linking sulfur. On the contrary, a sulfide solid electrolyte material of the first embodiment may lower hydrogen sulfide generation amount by reason of containing substantially no cross-linking sulfur.

A sulfide solid electrolyte material of the first embodiment is characterized by "containing substantially no cross-linking sulfur and $Li_2S$". Here, "cross-linking sulfur" signifies cross-linking sulfur in a compound obtained by a reaction of $Li_2S$ and sulfide of an element of the group 14 or the group 15. For example, cross-linking sulfur with $S_3P$—$S$—$PS_3$ obtained by a reaction of $Li_2S$ and $P_2S_5$ corresponds thereto. Such cross-linking sulfur reacts easily with water to easily generate hydrogen sulfide. In the present invention, too small ratio of $Li_2S$ in a raw material composition signifies that a sulfide solid electrolyte material contains cross-linking sulfur. In addition, the state of "contain substantially no cross-linking sulfur" may be confirmed by measuring Raman spectroscopy.

For example, in the case of an $Li_2S$—$P_2S_5$-based sulfide solid electrolyte material, it is preferable that a peak of $S_3P$—$S$—$PS_3$ does not exist. The peak of $S_3P$—$S$—$PS_3$ ordinarily appears at 402 $cm^{-1}$. Thus, in the present invention, it is preferable that this peak is not detected. A peak of $PS_4$ ordinarily appears at 417 $cm^{-1}$. In the present invention, the intensity $I_{402}$ at 402 $cm^{-1}$ is preferably smaller than the intensity $I_{417}$ at 417 $cm^{-1}$. More specifically, the intensity $I_{402}$ is, for example, preferably 70% or less, more preferably 50% or less, and far more preferably 35% or less with respect to the intensity $I_{417}$.

On the other hand, "contain substantially no $Li_2S$" signifies "contain substantially no $Li_2S$ derived from a starting material". $Li_2S$ reacts easily with water to easily generate hydrogen sulfide. In the present invention, too large ratio of $Li_2S$ in a raw material composition signifies that a sulfide solid electrolyte material contains $Li_2S$. In addition, the state of "contain substantially no $Li_2S$" may be confirmed by X-ray diffraction. Specifically, in the case of not having a peak of $Li_2S$ ($2\theta=27.0°$, $31.2°$, $44.8°$ and $53.1°$), the state of "contain substantially no $Li_2S$" may be determined.

(1) Raw Material Composition

A raw material composition used for a sulfide solid electrolyte material of the first embodiment is first described. A raw material composition in the first embodiment contains $Li_2S$ and sulfide of an element of the group 14 or the group 15. A raw material composition may further contain other compounds.

$Li_2S$ contained in a raw material composition preferably has fewer impurities. The reason therefor is to allow a side reaction to be restrained. Examples of a synthesis method for $Li_2S$ include a method described in Japanese Patent Application Publication No. H07-330312. In addition, $Li_2S$ is preferably purified by using a method described in WO2005/040039.

A raw material composition contains sulfide of an element of the group 14 or the group 15. The element of the group 14 or the group 15 is not particularly limited; examples thereof include Si, P and Ge, and P is preferable among them. The reason therefor is to obtain a sulfide solid electrolyte material with low hydrogen sulfide generation amount and high Li ion conductivity. Specific examples of sulfide of an element of the group 14 or the group 15 include $P_2S_3$, $P_2S_5$, $SiS_2$, $GeS_2$, $As_2S_3$ and $Sb_2S_3$. A raw material composition may contain the above-mentioned plural sulfides.

A raw material composition may contain lithium ortho-oxoacid of at least one kind selected from the group consisting of $Li_3PO_4$, $Li_4SiO_4$, $Li_4GeO_4$, $Li_3BO_3$ and $Li_3AlO_3$ except for $Li_2S$ and sulfide of an element of the group 14 or the group 15. The addition of such lithium ortho-oxoacid allows a more stable sulfide solid electrolyte material.

In the first embodiment, a raw material composition preferably contains at least $Li_2S$ and $P_2S_5$, and more preferably contains only $Li_2S$ and $P_2S_5$. The reason therefor is to obtain a sulfide solid electrolyte material with low hydrogen sulfide generation amount and high Li ion conductivity. In this case, the molar fraction of $Li_2S$ contained in a raw material composition is not particularly limited if it is a ratio for obtaining a sulfide solid electrolyte material containing substantially no cross-linking sulfur and $Li_2S$; preferably, for example, within a range of 70% to 85%, above all, within a range of 70% to 80%, particularly, within a range of 72% to 78%. The reason therefor is that hydrogen sulfide generation amount may be lowered more by determining the range of a molar fraction of the $Li_2S$ at the range including a value (75%) for obtaining an ortho-composition and the vicinity thereof.

In the first embodiment, a raw material composition preferably contains at least $Li_2S$ and $SiS_2$, and more preferably contains only $Li_2S$ and $SiS_2$. Similarly, a raw material composition preferably contains at least $Li_2S$ and $GeS_2$, and more preferably contains only $Li_2S$ and $GeS_2$. The reason therefor is to obtain a sulfide solid electrolyte material with low hydrogen sulfide generation amount and high Li ion conductivity. In these cases, the molar fraction of the $Li_2S$ contained in a raw material composition is not particularly limited if it is a ratio for obtaining a sulfide solid electrolyte material containing substantially no cross-linking sulfur and $Li_2S$; preferably, for example, within a range of 50% to 80%, above all, within a range of 55% to 75%, and particularly, within a range of 60% to 70%. The reason therefor is that hydrogen sulfide generation amount may be lowered more by determining the range of a molar fraction of the $Li_2S$ at a value (66.7%) for obtaining an ortho-composition and the vicinity thereof.

(2) Sulfide Solid Electrolyte Material

A sulfide solid electrolyte material of the first embodiment uses a raw material composition containing $Li_2S$ and sulfide of an element of the group 14 or the group 15. Above all, a sulfide solid electrolyte material of the first embodiment is preferably obtained by amorphization treatment with the use of the above-mentioned raw material composition. The reason therefor is to efficiently obtain a sulfide solid electrolyte material containing substantially no cross-linking sulfur and $Li_2S$. Examples of amorphization treatment include mechanical milling and melt extraction, and mechanical milling is preferable among them. The reason therefor is that treatment at normal temperature may be performed to intend the simplification of production processes.

A sulfide solid electrolyte material of the first embodiment may be sulfide glass or crystallized sulfide glass obtained by heat-treating the sulfide glass if the material contains substantially no cross-linking sulfur and $Li_2S$. Among them, a sulfide solid electrolyte material of the first embodiment is preferably sulfide glass. The reason therefor is that it is conceived that sulfide glass may absorb expansion and contraction of an active material to be excellent in cycle characteristics in the case of producing a solid state battery by reason of being soft as compared with crystallized sulfide glass. Sulfide glass may be obtained by performing the above-mentioned amorphization treatment for a raw material composition. On the other hand, crystallized sulfide glass may be obtained, for example, by heat-treating sulfide glass. That is to say, crystallized sulfide glass may be obtained by sequentially performing amorphization treatment and thermal treatment for a raw material composition. Depending on the conditions of thermal treatment, there are a possibility of producing cross-linking sulfur and $Li_2S$ and a possibility of producing a metastable phase, so that thermal treatment temperature and thermal treatment time are preferably adjusted so as not to produce these in the present invention. In particular, it is preferable that crystallized sulfide glass in the present invention does not have a metastable phase.

With regard to a sulfide solid electrolyte material of the first embodiment, hydrogen sulfide generation amount for 300 seconds from the start of measurement in a predetermined hydrogen sulfide amount measurement test is preferably 10 cc/g or less, more preferably 5 cc/g or less, far more preferably 3 cc/g or less, and particularly preferably 1 cc/g or less. The reason therefor is that less hydrogen sulfide generation amount allows a sulfide solid electrolyte material with higher safety. Here, the hydrogen sulfide amount measurement test is the following test. A sulfide solid electrolyte material is weighed by 100 mg in an argon atmosphere, and the sample is pressed at a pressure of 5.1 ton/cm$^2$ by using a pelleting machine having a molding portion with an area of 1 cm$^2$ to form pellets. Thereafter, the obtained pellets are disposed inside a hermetically sealed desiccator (1755 cc, air atmosphere, a temperature of 25° C., and a humidity of 40) to measure hydrogen sulfide generation amount generated for 300 seconds from the start by using a hydrogen sulfide sensor.

A sulfide solid electrolyte material of the first embodiment is preferably high in Li ion conductivity. Li ion conductivity at normal temperature is, for example, preferably 10$^{-5}$ S/cm or more, and more preferably 10$^{-4}$ S/cm or more. A sulfide solid electrolyte material of the first embodiment is ordinarily powdery and the average particle diameter thereof is within a range of 0.1 μm to 50 μm, for example. Examples of uses of a sulfide solid electrolyte material include a lithium battery. The above-mentioned lithium battery may be an all solid lithium battery comprising a solid electrolyte layer or a lithium battery comprising liquid electrolyte.

2. Second Embodiment

Next, a second embodiment of a sulfide solid electrolyte material of the present invention is described. The sulfide solid electrolyte material of the second embodiment is a sulfide solid electrolyte material obtained by amorphizing a raw material composition containing only $Li_2S$ and $P_2S_5$, characterized in that the molar fraction of the $Li_2S$ in the above-mentioned raw material composition is within a range of 70% to 85%.

The embodiment allows a sulfide solid electrolyte material with less hydrogen sulfide generation amount for the reason that the molar fraction of the $Li_2S$ in a raw material composition is in a predetermined range. Such a sulfide solid electrolyte material is conceived to be high in stability toward water and low in hydrogen sulfide generation amount by reason of having an ortho-composition or a composition in the neighborhood thereof. The preferable range of the molar fraction of the $Li_2S$ in a raw material composition, amorphization treatment for amorphizing, and other items are the same as the contents described in the above-mentioned "1. First embodiment".

The present invention may also provide a sulfide solid electrolyte material obtained by amorphizing a raw material composition containing only $Li_2S$ and $SiS_2$, characterized in that the molar fraction of the $Li_2S$ in the above-mentioned raw material composition is within a range of 50% to 80%. Similarly, the present invention may also provide a sulfide solid electrolyte material obtained by amorphizing a raw material composition containing only $Li_2S$ and $GeS_2$, characterized in that the molar fraction of the $Li_2S$ in the above-mentioned raw material composition is within a range of 50% to 80%. These sulfide solid electrolyte materials are also conceived to be low in hydrogen sulfide generation amount for the same reason as the above. The preferable range of the molar fraction of the $Li_2S$ in a raw material composition, amorphization treatment for amorphizing, and other items are the same as the contents described in the above-mentioned "1. First embodiment".

B. Lithium Battery

Next, a lithium battery of the present invention is described. The lithium battery of the present invention comprises a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the above-mentioned sulfide solid electrolyte material.

According to the present invention, the use of the above-mentioned sulfide solid electrolyte material allows a lithium battery with less hydrogen sulfide generation amount.

FIG. 1 is a schematic cross-sectional view showing an example of a power generating element of a lithium battery of the present invention. A power generating element 10 shown in FIG. 1 comprises a cathode active material layer 1 containing a cathode active material, an anode active material layer 2 containing an anode active material, and an electrolyte layer 3 formed between the cathode active material layer 1 and the anode active material layer 2. In addition, in the present invention, at least one of the cathode active material layer 1, the anode active material layer 2 and the electrolyte layer 3 is greatly characterized by containing the above-mentioned sulfide solid electrolyte material.

A lithium battery of the present invention is hereinafter described in each constitution.

1. Electrolyte Layer

An electrolyte layer in the present invention is first described. The electrolyte layer in the present invention is a layer formed between the cathode active material layer and the anode active material layer. The electrolyte layer is not particularly limited if it is a layer for allowing Li ion conduction, and is preferably a solid electrolyte layer composed of a solid electrolyte material. The reason therefor is to obtain a lithium battery (an all solid battery) with high safety. In addition, in the present invention, a solid electrolyte layer preferably contains the above-mentioned sulfide solid electrolyte material. The ratio of the sulfide solid electrolyte material contained in a solid electrolyte layer is preferably, for example, within a range of 10% by volume to 100% by volume, and above all, within a range of 50% by volume to 100% by volume. In particular, in the present invention, a solid electrolyte layer is preferably composed of only the sulfide solid electrolyte material. The reason therefor is to obtain a lithium battery with less hydrogen sulfide generation amount. The thickness of a solid electrolyte layer is preferably within a range of 0.1 μm to 1000 μm, for example, and within a range of 0.1 μm to 300 m, above all. Examples of a method for forming a solid electrolyte layer include a method for compression-molding a solid electrolyte material.

An electrolyte layer in the present invention may be a layer composed of liquid electrolyte. The use of liquid electrolyte allows a high-output lithium battery. In this case, ordinarily, at least one of the cathode active material layer and the anode active material layer contains the above-mentioned sulfide solid electrolyte material. Liquid electrolyte ordinarily contains lithium salt and organic solvent (nonaqueous solvent). Examples of the lithium salt include inorganic lithium salts such as $LiPF_6$, $LiBF_6$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate.

2. Cathode Active Material Layer

Next, a cathode active material layer in the present invention is described. A cathode active material layer in the present invention is a layer containing at least a cathode active material, and may contain at least one of a solid electrolyte material, a conductive material and a binder, as required. In particular, in the present invention, a solid electrolyte material contained in a cathode active material layer is preferably the above-mentioned sulfide solid electrolyte material. The reason therefor is to obtain a lithium battery with less hydrogen sulfide generation amount. The ratio of a sulfide solid electrolyte material contained in a cathode active material layer varies with kinds of a lithium battery; preferably, for example, within a range of 0.1% by volume to 80% by volume, above all, within a range of 1% by volume to 60% by volume, particularly, within a range of 10% by volume to 50% by volume. Examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

A cathode active material in the present invention may further contain a conductive material. The addition of the conductive material allows conductivity of a cathode active material layer to be improved. Examples of the conductive material include acetylene black, Ketjen Black and carbon fiber. A cathode active material layer may also contain a binder. Examples of kinds of the binder include a fluorine-containing binder. The thickness of a cathode active material layer is preferably within a range of 0.1 μm to 1000 μm, for example.

3. Anode Active Material Layer

Next, an anode active material layer in the present invention is described. An anode active material layer in the present invention is a layer containing at least an anode active material, and may contain at least one of a solid electrolyte material, a conductive material and a binder, as required. In particular, in the present invention, a solid electrolyte material contained in an anode active material layer is preferably the above-mentioned sulfide solid electrolyte material. The reason therefor is to obtain a lithium battery with less hydrogen sulfide generation amount. The ratio of a sulfide solid electrolyte material contained in an anode active material layer varies with kinds of a lithium battery; preferably, for example, within a range of 0.1% by volume to 80% by volume, above all, within a range of 1% by volume to 60% by volume, and particularly, within a range of 10% by volume to 50% by volume. Examples of an anode active material include a metal active material and a carbon active material. Examples of the metal active material include In, Al, Si, and Sn. On the other hand, examples of the carbon active material include meso-carbon microbeads (MCMB), high orientation property graphite (HOPG), hard carbon and soft carbon. A solid electrolyte material and a conductive material used for an anode active material layer are the same as the case of the above-mentioned cathode active material layer. The thickness of an anode active material layer is within a range of 0.1 to 1000 μm, for example.

4. Other Constitutions

A lithium battery of the present invention comprises at least the above-mentioned cathode active material layer, electrolyte layer and anode active material layer, ordinarily further comprises a cathode current collector for collecting the cathode active material layer and an anode current collector for collecting the anode active material layer. Examples of a material for the cathode current collector include SUS, aluminum, nickel, iron, titanium and carbon, preferably SUS among them. On the other hand, examples of a material for the anode current collector include SOS, copper, nickel and carbon, preferably SUS among them. The thickness and shape of the cathode current collector and the anode current collector are preferably selected properly in accordance with uses of a lithium battery. A battery case of a general lithium battery may be used for a battery case used for the present invention. Examples of the battery case include a battery case made of SUS. In the case where a lithium battery of the present invention is an all solid battery, a power generating element may be formed inside an insulating ring.

5. Lithium Battery

A lithium battery of the present invention may be a primary battery or a secondary battery, preferably a secondary battery among them. The reason therefor is to be repeatedly charged and discharged and be useful as a car-mounted battery, for example. Examples of the shape of a lithium battery of the present invention include a coin shape, a laminate shape, a cylindrical shape and a rectangular shape.

A producing method for a lithium battery of the present invention is not particularly limited if it is a method for obtaining the above-mentioned lithium battery, and the same method as a producing method for a general lithium battery may be used. In the case where a lithium battery of the present invention is an all solid battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is swaged. The present invention may also provide each of a cathode active material layer, an anode active material layer and a solid electrolyte layer, characterized by containing the above-mentioned sulfide solid electrolyte material.

C. Producing Method for Sulfide Solid Electrolyte Material

Next, a producing method for a sulfide solid electrolyte material of the present invention is described. A producing method for a sulfide solid electrolyte material of the present invention comprises the steps of: preparing a raw material composition containing $Li_2S$ and sulfide including an element of the group 14 or the group 15 in the periodic table, and amorphizing the above-mentioned raw material composition by amorphization treatment, characterized in that the raw material composition contains the $Li_2S$ and the sulfide including an element of the group 14 or the group 15 at a ratio for allowing a sulfide solid electrolyte material containing substantially no cross-linking sulfur and $Li_2S$.

The present invention allows a sulfide solid electrolyte material with less hydrogen sulfide generation amount for the reason that a raw material composition contains $Li_2S$ and sulfide including an element of the group 14 or the group 15 at a predetermined ratio.

Figure 2:
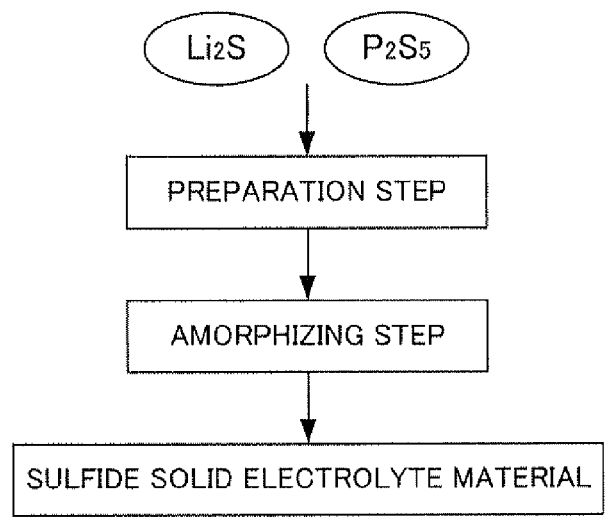
FIG. 2 is an explanatory view explaining an example of a producing method for a sulfide solid electrolyte material of the present invention.

FIG. 2 is an explanatory view explaining an example of a producing method for a sulfide solid electrolyte material of the present invention. In the producing method shown in FIG. 2, lithium sulfide ($Li_2S$) and phosphorus pentasulfide ($P_2S_5$) are first prepared as a starting material. Next, these starting materials are mixed so that the molar fraction of $Li_2S$ becomes 75% to prepare a raw material composition (preparation step). Thereafter, the raw material composition and a grinding ball are projected into a pot, which is hermetically sealed. Next, this pot is mounted on a planetary ball milling machine to amorphize the raw material composition (amorphizing step). Thus, a sulfide solid electrolyte material containing substantially no cross-linking sulfur and $Li_2S$ is obtained from the raw material composition.

A producing method for a sulfide solid electrolyte material of the present invention is hereinafter described at each step. In the present invention, each of the after-mentioned steps is preferably performed under an inert gas atmosphere (for example, under an Ar gas atmosphere).

1. Preparation Step

Preparation step in the present invention is step of preparing a raw material composition containing $Li_2S$ and sulfide including an element of the group 14 or the group 15. In addition, a raw material composition contains $Li_2S$ and sulfide including an element of the group 14 or the group 15 at a ratio for allowing a sulfide solid electrolyte material containing substantially no cross-linking sulfur and $Li_2S$. A raw material composition used for the present invention is the same as the contents described in the above-mentioned "A. Sulfide solid electrolyte material"; therefore, the description will not be repeated here. With regard to a raw material composition, each component is preferably dispersed uniformly.

2. Amorphizing Step

Amorphizing step in the present invention is step of amorphizing the above-mentioned raw material composition by amorphization treatment. Thus, sulfide glass is ordinarily obtained. Examples of amorphization treatment include mechanical milling and melt extraction, and mechanical milling is preferable among them. The reason therefor is that treatment at normal temperature may be performed to intend the simplification of production processes.

The mechanical milling is not particularly limited if it is a method for mixing a raw material composition while allowing mechanical energy thereto; examples thereof include ball mill, turbo mill, mechano-fusion and disk mill, and ball mill is preferable among them and planetary ball mill is particularly preferable. The reason therefor is to efficiently obtain a desired sulfide solid electrolyte material.

Various kinds of the conditions of the mechanical milling are preferably determined so as to obtain a sulfide solid electrolyte material containing substantially no cross-linking sulfur and $Li_2S$. For example, in the case of synthesizing a sulfide solid electrolyte material by planetary ball mill, a raw material composition and a grinding ball are added into a pot and treated at predetermined number of revolutions and time. Generally, larger number of revolutions brings higher production rate of a sulfide solid electrolyte material, and longer treating time brings higher conversion ratio of a raw material composition into a sulfide solid electrolyte material. The number of revolutions in performing planetary ball mill is preferably within a range of 200 rpm to 500 rpm, for example, and within a range of 250 rpm to 400 rpm, above all. The treating time in performing planetary ball mill is preferably within a range of 1 hour to 100 hours, for example, and within a range of 1 hour to 50 hours, above all.

3. Heat-Treating Step

Heat-treating step of heat-treating the sulfide glass obtained in amorphizing step may be performed in the present invention. Thus, crystallized sulfide glass is ordinarily obtained. Depending on the conditions of thermal treatment, there are a possibility of producing cross-linking sulfur and $Li_2S$ and a possibility of producing a metastable phase, so that thermal treatment temperature and thermal treatment time are preferably adjusted so as not to produce these in the present invention.

4. Others

A sulfide solid electrolyte material obtained by the present invention is the same as the contents described in the above-mentioned "A. Sulfide solid electrolyte material"; therefore, the description will not be repeated here. The present invention may provide a sulfide solid electrolyte material comprising the above-mentioned preparation step and amorphizing step. Similarly, the present invention may provide a sulfide solid electrolyte material comprising the above-mentioned preparation step, amorphizing step and heat-treating step.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Examples 1-1 to 1-3

Lithium sulfide ($Li_2S$) and phosphorus pentasulfide ($P_2S_5$) were used as a starting material. These powders were weighed in a glove box under an argon atmosphere so as to become a molar ratio of x=70 in a composition of $xLi_2S \cdot (100-x)P_2S_5$, and mixed by an agate mortar to obtain a raw material composition. Next, 1 g of the obtained raw material composition was projected into a 45-ml zirconia pot, and zirconia ball ($\phi$=10 mm, 10 pieces) was further projected thereinto to hermetically seal the pot completely. This pot was mounted on a planetary ball milling machine to perform mechanical milling for 40 hours at the number of revolutions of 370 rpm and then obtain a sulfide solid electrolyte material (Example 1-1). A sulfide solid electrolyte material was obtained in the same manner as Example 1-1 except for modifying the value of x into x=75, 80 respectively in a composition of $xLi_2S \cdot (100-x)P_2S_5$ (Examples 1-2, 1-3).

Comparative Examples 1-1 to 1-4

A sulfide solid electrolyte material was obtained in the same manner as Example 1-1 except for modifying the value of x into x=0, 50, 66.7 and 100 respectively in a composition of $xLi_2S \cdot (100-x)P_2S_5$.

Comparative Example 1-5

A sulfide solid electrolyte material composed of crystallized sulfide glass was obtained by further heat-treating the sulfide solid electrolyte material (x=70) obtained in Example 1-1 on the conditions of an argon atmosphere, a temperature of 290° C. and 2 hours.

[Evaluation 1]

(Raman Spectroscopy Measurement)

Figure 3:
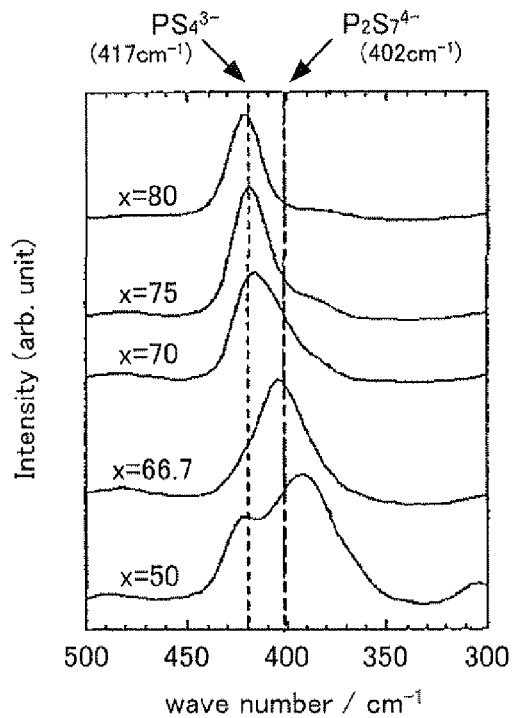
FIG. 3 is a result of Raman spectroscopy measurement of the sulfide solid electrolyte materials obtained in Examples 1-1 to 1-3 and Comparative Examples 1-2, 1-3.

Raman spectroscopy measurement was performed by using the sulfide solid electrolyte materials obtained in Examples 1-1 to 1-3 and Comparative Examples 1-2, 1-3. The results are shown in FIG. 3. As shown in FIG. 3, in Comparative Example 1-2 (x=50) and Comparative Example 1-3 (x=66.7), a peak of $P_2S_7$ ($S_3P$—S—$PS_3$) containing cross-linking sulfur was confirmed in the vicinity of 417 $cm^{-1}$. On the other hand, in Example 1-1 (x=70), Example 1-2 (x=75) and Example 1-3 (x=80), the intensity $I_{402}$/the intensity $I_{417}$ became 65%, 30% and 14%, respectively. Thus, it was confirmed that the sulfide solid electrolyte materials obtained in Examples 1-1 to 1-3 had substantially no cross-linking sulfur.
(X-Ray Diffraction Measurement)

Figure 4:
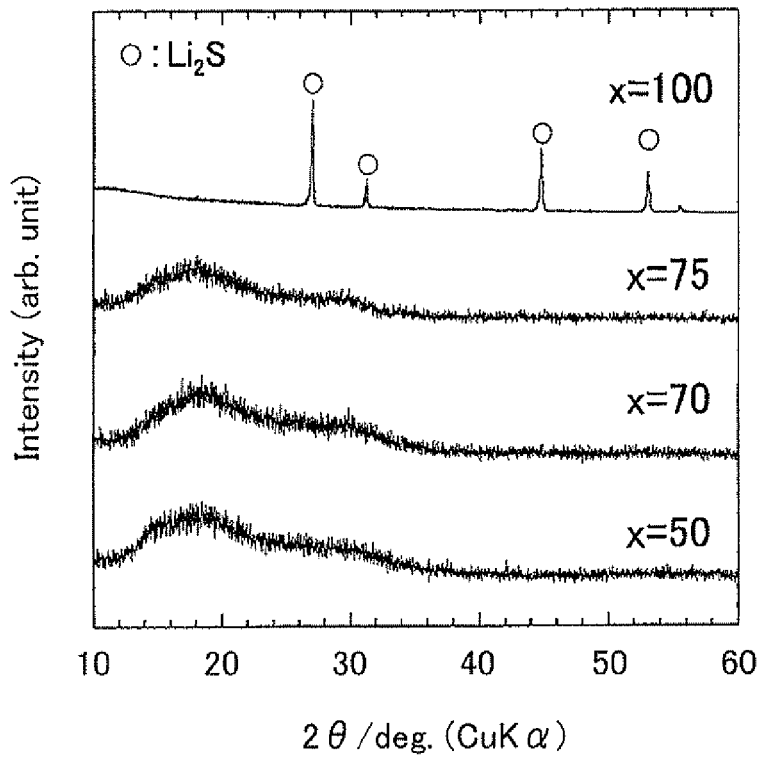
FIG. 4 is a result of X-ray diffraction measurement of the sulfide solid electrolyte materials obtained in Examples 1-1, 1-2 and Comparative Examples 1-2, 1-4.

X-ray diffraction measurement was performed by using the sulfide solid electrolyte materials obtained in Examples 1-1, 1-2 and Comparative Examples 1-2, 1-4. The results are shown in FIG. 4. As shown in FIG. 4, a peak of $Li_2S$ was confirmed in Comparative Example 1-4 (x=100); however, a peak of $Li_2S$ was not confirmed in Examples 1-1, 1-2 and Comparative Examples 1-2. Thus, it was confirmed that the sulfide solid electrolyte materials obtained in Examples 1-1, 1-2 and Comparative Examples 1-2 had substantially no $Li_2S$.
(Measurement of Sulfide Generation Amount as Pellet)

The sulfide solid electrolyte materials obtained in Examples 1-1 to 1-3 and Comparative Examples 1-1 to 1-4 were each weighed by 100 mg, and these samples were pressed at a pressure of 5.1 ton/cm$^2$ by using a pelleting machine having a molding portion with an area of 1 cm$^2$ to obtain pellets. Thereafter, the obtained pellets were disposed inside a hermetically sealed desiccator (1755 cc, air atmosphere, a temperature of 25° C., and a humidity of 40%) to measure hydrogen sulfide generation amount generated for 300 seconds from the start by using a hydrogen sulfide sensor. These results are shown in FIG. 5.

Figure 5:
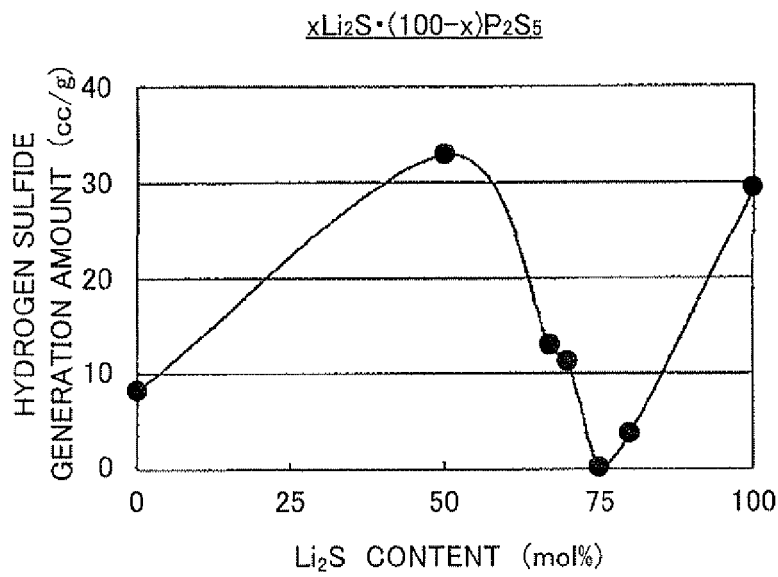
FIG. 5 is a result of hydrogen sulfide generation amount measurement (pellet) of the sulfide solid electrolyte materials obtained in Examples 1-1 to 1-3 and Comparative Examples 1-1 to 1-4.

As shown in FIG. 5, it was confirmed that hydrogen sulfide generation amounts were low in Examples 1-1 to 1-3 as compared with Comparative Examples 1-1 to 1-4. In particular, in the value (x=75) for obtaining an ortho-composition, hydrogen sulfide generation amount offered the minimum value (0.2 cc/g).
(Measurement of Sulfide Generation Amount as Battery)

An all solid lithium battery was each produced by using the sulfide solid electrolyte materials obtained in Example 1-2 and Comparative Example 1-5. The battery was all produced in an argon atmosphere. The sulfide solid electrolyte material (51 mg) was first pressed at a pressure of 1 ton/cm$^2$ by using a pelleting machine to form a solid electrolyte layer. Next, a cathode mix composed of $LiCoO_2$ (8.9 mg) and the above-mentioned sulfide solid electrolyte material (3.8 mg) was added on the surface of the solid electrolyte layer and pressed at a pressure of 1 ton/cm$^2$ by using a pelleting machine to form a cathode active material layer. Next, an anode mix composed of graphite (4.71 rag) and the above-mentioned sulfide solid electrolyte material (4.71 mg) was added on the surface of the solid electrolyte layer, on which the cathode active material layer was not formed, and pressed at a pressure of 4.3 ton/cm$^2$ by using a pelleting machine to form an anode active material layer. Thus, a power generating element was obtained. The power generating element was held by SUS, which is a current collector, to produce an all solid lithium battery.

Figure 6:
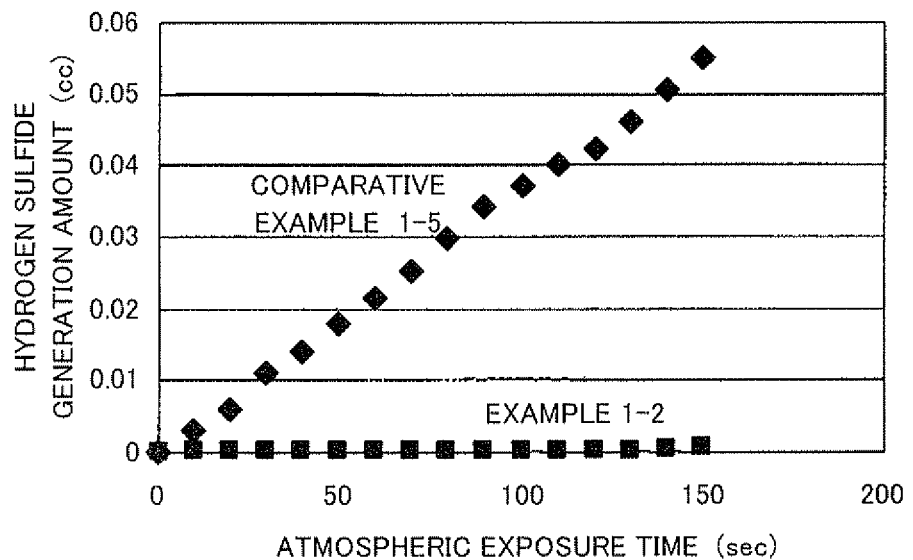
FIG. 6 is a result of hydrogen sulfide generation amount measurement (battery) of the sulfide solid electrolyte materials obtained in Example 1-2 and Comparative Example 1-5.

Each of the obtained all solid lithium battery was disposed inside a hermetically sealed desiccator (1755 cc, air atmosphere, a temperature of 25° C., a humidity of 40%) to measure a change in hydrogen sulfide generation amount with respect to atmospheric exposure time by using a hydrogen sulfide sensor. These results are shown in FIG. 6. As shown in FIG. 6, in Comparative Example 1-5, hydrogen sulfide generation amount increased with time and hydrogen sulfide generation amount after 150 seconds was 0.056 cc. On the contrary, in Example 1-2, the chronological increase of hydrogen sulfide generation amount was not observed and hydrogen sulfide generation amount after 150 seconds was 0.001 cc or less.

Examples 2-1, 2-2

Lithium sulfide ($Li_2S$) and silicon sulfide ($SiS_2$) were used as a starting material. These powders were weighed in a glove box under an argon atmosphere so as to become a molar ratio of x=50 in a composition of $xLi_2S \cdot (100-x)SiS_2$, and mixed by an agate mortar to obtain a raw material composition. A sulfide solid electrolyte material was obtained in the same manner as Example 1-1 except for using this raw material composition (Example 2-1). A sulfide solid electrolyte material was obtained in the same manner as Example 2-1 except for modifying the value of x into x=66.7 in a composition of $xLi_2S \cdot (100-x)SiS_2$ (Example 2-2).

Comparative Examples 2-1, 2-2

A sulfide solid electrolyte material was obtained in the same manner as Example 2-1 except for modifying the value of x into x=0, 100 respectively in a composition of $xLi_2S \cdot (100-x)SiS_2$.

Examples 3-1 to 3-3

Lithium sulfide ($Li_2S$) and germanium sulfide ($GeS_2$) were used as a starting material. These powders were weighed in a glove box under an argon atmosphere so as to become a molar ratio of x=50 in a composition of $xLi_2S \cdot (100-x)GeS_2$, and mixed by an agate mortar to obtain a raw material composition. A sulfide solid electrolyte material was obtained in the same manner as Example 1-1 except for using this raw material composition (Example 3-1). A sulfide solid electrolyte material was obtained in the same manner as Example 3-1 except for modifying the value of x into x=66.7, 75 respectively in a composition of $xLi_2S \cdot (100-x)GeS_2$ (Examples 3-2, 3-3).

Comparative Examples 3-1, 3-2

A sulfide solid electrolyte material was obtained in the same manner as Example 3-1 except for modifying the value of x into x=0, 100 respectively in a composition of $xLi_2S \cdot (100-x)GeS_2$.

Comparative Examples 4-1 to 4-4

Lithium sulfide ($Li_2S$) and aluminum sulfide ($Al_2S_3$) were used as a starting material. These powders were weighed in a glove box under an argon atmosphere so as to become a molar ratio of x=0, 50, 75 and 100 in a composition of $xLi_2S \cdot (100\text{-}x)Al_2S_3$, and mixed by an agate mortar to obtain a raw material composition. A sulfide solid electrolyte material was obtained in the same manner as Example 1-1 except for using these raw material compositions.

[Evaluation 2]
(Measurement of Sulfide Generation Amount as Pellet)

Figure 7:
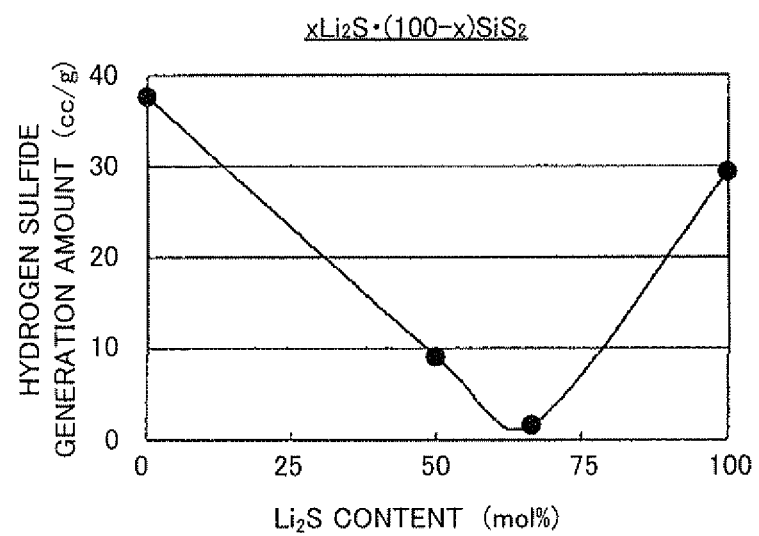
FIG. 7 is a result of hydrogen sulfide generation amount measurement (pellet) of the sulfide solid electrolyte materials obtained in Examples 2-1, 2-2 and Comparative Examples 2-1, 2-2.
Figure 8:
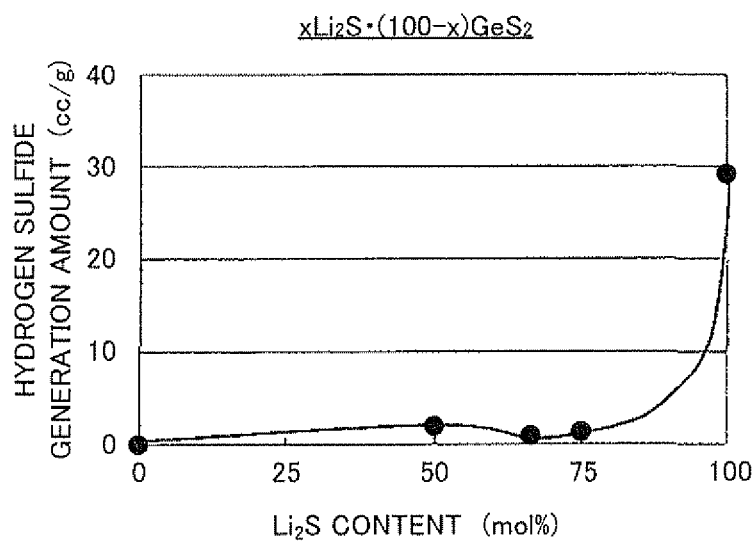
FIG. 8 is a result of hydrogen sulfide generation amount measurement (pellet) of the sulfide solid electrolyte materials obtained in Examples 3-1 to 3-3 and Comparative Examples 3-1, 3-2.
Figure 9:
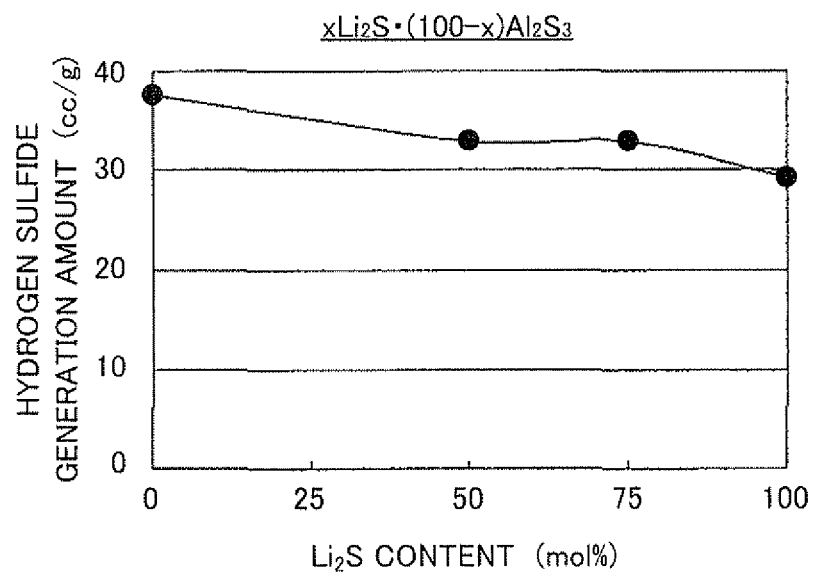
FIG. 9 is a result of hydrogen sulfide generation amount measurement (pellet) of the sulfide solid electrolyte materials obtained in Comparative Examples 4-1 to 4-4.

The measurement of sulfide generation amount as pellet was performed by using the sulfide solid electrolyte material obtained in Examples 2-1, 2-2, Comparative Examples 2-1, 2-2, Examples 3-1 to 3-3, Comparative Examples 3-1, 3-2, and Comparative Examples 4-1 to 4-4. The producing method for pellet and the measuring method for hydrogen sulfide generation amount are the same as the above. The results are shown in FIGS. 7 to 9. As shown in FIG. 7, it was confirmed that hydrogen sulfide generation amounts were low in Examples 2-1, 2-2 as compared with Comparative Examples 2-1, 2-2. In particular, in the value (x=66.7) for obtaining an ortho-composition, hydrogen sulfide generation amount offered the minimum value. Similarly, as shown in FIG. 8, it was confirmed that hydrogen sulfide generation amount was low in Examples 3-1 to 3-3 as compared with Comparative Example 3-2. In particular, in the value (x=66.7) for obtaining an ortho-composition, hydrogen sulfide generation amount offered the minimum value. Comparative Example 3-1 exhibited no Li ion conductivity by reason of containing no Li. On the other hand, as shown in FIG. 9, hydrogen sulfide generation amount was high in any of Comparative Examples 4-1 to 4-4. Thus, in the case of the sulfide solid electrolyte material using Al as an element of the group 13, it was confirmed that the minimum value such as the sulfide solid electrolyte material using Si and Ge as an element of the group 14 and P as an element of the group 15 was not offered in an ortho-composition. As a result of measuring sulfide generation amount as a battery by using the sulfide solid electrolyte materials obtained in Examples 2-1, 2-2, and Examples 3-1 to 3-3, hydrogen sulfide generation amount might be lowered in any of them.

REFERENCE SIGNS LIST

1 . . . cathode active material layer
2 . . . anode active material layer
3 . . . electrolyte layer
10 . . . power generating element

The invention claimed is:

1. A sulfide solid electrolyte material comprising $Li_3PS_4$, wherein no $Li_2S$ peak is observed by X-ray diffraction, an intensity $I_{402}$ at 402 $cm^{-1}$ is 35% or less with respect to an intensity $I_{417}$ at 417 $cm^{-1}$ by Raman spectroscopy, and in the case that 100 mg of the sulfide solid electrolyte material is pressed at a pressure of 5.1 $ton/cm^2$ by using a pelleting machine having a molding portion with an area of 1 $cm^2$ to form a pellet, and the pellet is disposed inside a hermetically sealed desiccator at 1755 cc, air atmosphere, a temperature of 25° C., and a humidity of 40%, to measure a hydrogen sulfide generation amount generated for 300 seconds from the start by using a hydrogen sulfide sensor, the hydrogen sulfide generation amount is 1 cc/g or less.

2. The sulfide solid electrolyte material according to claim 1, wherein the sulfide solid electrolyte material is obtained by a raw material composition containing $Li_2S$ and $P_2S_5$.

3. The sulfide solid electrolyte material according to claim 1, wherein the sulfide solid electrolyte material is a sulfide glass.

4. A lithium battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 1.

5. A lithium battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 2.

6. A lithium battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 3.

7. The sulfide solid electrolyte material according to claim 1, wherein the hydrogen sulfide generation amount is 0.2 cc/g or less.

* * * * *